(12) United States Patent  (10) Patent No.: US 8,379,641 B2
Nanda et al.  (45) Date of Patent: Feb. 19, 2013

(54) LIGHT HOST MANAGEMENT PROTOCOL ON MULTICAST CAPABLE ROUTER

(75) Inventors: Avoy K. Nanda, Milpitas, CA (US); Kunal R. Shah, Milpitas, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 509 days.

(21) Appl. No.: 12/558,365

(22) Filed: Sep. 11, 2009

(65) Prior Publication Data

US 2011/0013630 A1  Jan. 20, 2011

Related U.S. Application Data

(60) Provisional application No. 61/227,027, filed on Jul. 20, 2009.

(51) Int. Cl.
  *H04L 12/56* (2006.01)
(52) U.S. Cl. ........ 370/390; 370/392; 370/401; 370/432; 709/245
(58) Field of Classification Search .......... None
  See application file for complete search history.

(56) References Cited

U.S. PATENT DOCUMENTS

| | | | |
|---|---|---|---|
| 6,324,575 | B1 | 11/2001 | Jain et al. |
| 7,478,173 | B1 | 1/2009 | Delco |
| 7,593,402 | B2 | 9/2009 | Song et al. |
| 7,623,517 | B2 | 11/2009 | Suzuki |
| 7,675,936 | B2 | 3/2010 | Mizutani et al. |
| 7,701,937 | B2 | 4/2010 | Narayanan et al. |
| 8,102,870 | B2 | 1/2012 | Guo et al. |
| 2007/0064695 | A1* | 3/2007 | Song et al. ............ 370/390 |
| 2007/0086458 | A1* | 4/2007 | Narayanan et al. ......... 370/390 |
| 2007/0223490 | A1* | 9/2007 | Mizutani et al. ......... 370/395.6 |
| 2009/0150966 | A1* | 6/2009 | Alao et al. .......... 725/151 |
| 2009/0219933 | A1* | 9/2009 | Guo et al. ............ 370/390 |
| 2010/0046516 | A1* | 2/2010 | Fernandez Gutierrez .... 370/390 |
| 2010/0265869 | A1* | 10/2010 | Sarikaya ............ 370/312 |
| 2011/0013630 | A1 | 1/2011 | Nanda et al. |

FOREIGN PATENT DOCUMENTS

EP  2066073 A1  6/2009

OTHER PUBLICATIONS

*Notice of Allowance*, U.S. Appl. No. 12/506,108, dated Aug. 1, 2012, 11 pages.
*Final Office Action*, U.S. Appl. No. 12/506,108, dated May 10, 2012, 12 pages.

* cited by examiner

*Primary Examiner* — Hassan Phillips
*Assistant Examiner* — Duc Duong
(74) *Attorney, Agent, or Firm* — Blakely Sokoloff Taylor & Zafman, LLP (57) ABSTRACT a method for reducing computational and/or bandwidth requirements in a network including a multicast router and a layer 2 network element by efficiently communicating required source state information. The method comprises receiving at the layer 2 network element a source interest list from a host over a multicast network. The layer 2 multicast network element transmits a message to the multicast router, the message formatted to be processed by a multicast routing protocol on the multicast router after a protocol header is removed by a light host management protocol on the multicast router without any additional processing. Responsive to receiving the message at the multicast router, the light host management protocol removes the protocol header and sending the message to the multicast routing protocol to alter a set of multicast sources to be routed to the host.

20 Claims, 5 Drawing Sheets

| Type = 0x22 | Reserved | Checksum |
|---|---|---|
| Reserved | | Number of Group records |
| Group record 1 | | |
| Group record 2 | | |
| ⋮ | | |
| ⋮ | | |
| ⋮ | | |

401 (header), 403 (group records)

FIG. 4A

| Record type | Aux data len | Number of sources |
|---|---|---|
| Group address | | |
| Source 1 | | |
| Source 2 | | |
| ⋮ | | |
| ⋮ | | |
| ⋮ | | |
| Aux data | | |

405 (record header), 407 (sources/aux)

FIG. 4B

| Type 10x23 | Group Module | Source Module | Source Count | Check Sum |
|---|---|---|---|---|
| Group Address |||||

501 brackets the above.

| Source 1 |
|---|
| Source 2 |
| • |
| • |
| Source N |

503 brackets the above.

FIG. 5

LIGHT HOST MANAGEMENT PROTOCOL ON MULTICAST CAPABLE ROUTER

CROSS-REFERENCE TO RELATED APPLICATIONS

This application claims priority to Provisional Application Ser. No. 61/227,027, filed Jul. 20, 2009. The present Application is related to a co-pending application with Ser. No. 12/506,108 titled "Efficient Host Management Protocol on Multicast Capable Router," filed on the same date as the provisional application.

FIELD OF THE INVENTION

Embodiments of the present invention relate to a system for managing multicast communication. Specifically, embodiments of the invention relate to efficient management of host requests for source data over a multicast network.

BACKGROUND

The use of multicast protocols and the administration of networks implementing multicast protocols are expanding to support new technologies such as Internet Protocol Television (IPTV) and on demand video. These networks utilize set top boxes (STBs), also referred to as hosts, which request data from a list of sources that are specified by the STBs. The sources are data sources that are available over a multicast network such as IPTV channels. These sources can be streamed using multicast to any number of hosts.

The STBs send their list of sources that they are requesting to receive through the multicast network via a host management protocol (HMP). HMPs include Internet Group Management Protocol (IGMP) and Multicast Listener Discover (MLD). These protocols then communicate the requested list of sources to a multicast routing protocol (MRP) to establish the routing of each requested source to the respective hosts. The MRPs include Protocol Independent Multicast (PIM). In some instances, the requested source interest list is transmitted through an L2 snooping device to a multicast router that executes the MRP.

The HMP communicates the entire list of requested sources to the MRP each time a source interest list is received from a host. This causes the MRP to reprocess sources that it has previously received from the HMP. There are two lists of sources that can be provided by the HMP to the MRP. One list of sources is a set of sources to be included (i.e., the host is requesting that these sources be sent to it) and the other list of source is a set of source to be excluded (i.e., the host is requesting that these resources not be sent to it). Multiple hosts on each subnet send these source interest lists and the HMP constructs and aggregates a source state per subnet comprising the interested sources for all the hosts on that subnet. When any of these hosts sends a new source interest list, the entire aggregated state in the HMP is sent to the MRP.

In a network where a L2 snooping network element is present between the hosts and the multicast router, the HMP on the L2 network element processes the received source interest lists from the hosts to update the snooping state maintained by it and forwards the sources lists in their entirety to the router so that the MRP can update the routing. On the router, the MRP is assisted by a local HMP to process the received source interest lists and communicate state to the MRP. The local HMP must retrieve source identification information from a set of group records in the received HMP messaged requiring significant processing of the received message by the HMP to enable the source identification information within the message to be provided to the MRP.

SUMMARY

Embodiments of the invention include a method for reducing computational and/or bandwidth requirements in a network including a multicast router and a layer 2 network element by efficiently communicating required source state information. The method comprises receiving at the layer 2 network element, executing a modified host management protocol, a source interest list from a host over a multicast network, the source interest list to identify at least one multicast source to be one of excluded or included from routing to the host. Responsive to the step of receiving, the layer 2 multicast network element transmits a message to the multicast router, the message formatted to be processed by a multicast routing protocol on the multicast router after a protocol header is removed by a light host management protocol on the multicast router without any additional processing. Responsive to receiving the message at the multicast router, the light host management protocol removes the protocol header and sending the message to the multicast routing protocol to alter a set of multicast sources to be routed to the host.

Embodiments of the invention include a network with reduced computational or bandwidth by efficiently communication source state information comprising a host device to track a first source interest list based on user input and to transmit the source interest list over a multicast network to a first network element, wherein the source interest list to identify at least one multicast source to be one of excluded or included from routing to the host. A first network element in communication with the host device over a multicast network executes a modified host management protocol, the modified host management protocol to generate a message based on the source interest list. The message is formatted to be processed by a multicast routing protocol after a protocol header is removed without any additional processing. The modified host management protocol transmits the message to a second network element executing a multicast routing protocol to alter a set of multicast sources to be routed to the host device. The second network element manages multicast routing based on the message received over the network from the first network element. The second network element executes a light host management protocol and the multicast routing protocol. The light host management protocol removes the protocol header from the message and forwards the message to the multicast routing protocol without further processing of the message.

Embodiments of the invention include a network element that executes a modified host management protocol to reduce computational and/or bandwidth requirements for multicast routing by efficiently communicating required source state information. The network element comprises a modified host management protocol component to receive a source interest list from a host over a network. The modified host management protocol component to generate a message based on the source interest list. The message formatted to be processed by a multicast routing protocol after a protocol header is removed without any additional processing. The modified host management protocol component to transmit the message to a second network element executing a light host management protocol and a multicast routing protocol to alter a set of multicast sources to be routed to the host.

Embodiments of the invention include a method for reducing computational and/or bandwidth requirements of multicast routing. The method comprises receiving at a multicast router a message formatted to be processed by a multicast routing protocol on the multicast router after a protocol header is removed by a light host management protocol on the multicast router without any additional processing. The message is generated and transmitted by a modified host management protocol on a layer 2 network element responsive to a source interest list received from a host. The source interest list identifies at least one multicast source to be one of excluded or included from routing to the host. The light host management protocol removes the protocol header in the multicast router. The message is provided with the protocol header removed to the multicast routing protocol. A set of multicast sources routings are altered to the host based on the message by the multicast routing protocol.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. Those of ordinary skill in the art, with the included descriptions, will be able to implement appropriate functionality without undue experimentation.

The operations of the flow diagrams will be described with reference to the exemplary embodiments of FIG. 1. However, it should be understood that the operations of flow diagrams can be performed by embodiments of the invention other than those discussed with reference to FIG. 1, and the embodiments discussed with reference to FIG. 1 can perform operations different than those discussed with reference to the flow diagrams of FIGS. 2 and 3.

The techniques shown in the figures can be implemented using code and data stored and executed on one or more electronic devices (e.g., an end station, a network element, etc.). Such electronic devices store and communicate (internally and/or with other electronic devices over a network) code and data using machine-readable media, such as machine-readable storage media (e.g., magnetic disks; optical disks; random access memory; read only memory; and flash memory devices; phase-change memory). In addition, such electronic devices typically include a set of one or more processors coupled to one or more other components, such as one or more storage devices, user input/output devices (e.g., a keyboard, a touch screen, and a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and hardware.

As used herein, a network element (e.g., a router, switch, bridge, etc.) is a piece of networking equipment, including hardware and software, that communicatively interconnects other equipment on the network (e.g., other network elements, end stations, etc.). Some network elements are "multiple services network elements" that provide support for multiple networking functions (e.g., routing, bridging, switching, Layer 2 aggregation, session border control, multicasting, and subscriber management), and/or provide support for multiple application services (e.g., data, voice, and video). Subscriber end stations (e.g., servers, workstations, laptops, palm tops, mobile phones, smart phones, multimedia phones, Voice Over Internet Protocol (VOIP) phones, portable media players, GPS units, gaming systems, set-top boxes (STBs), etc.) access content/services provided over the Internet and/or content/services provided on virtual private networks (VPNs) overlaid on the Internet. The content and/or services are typically provided by one or more end stations (e.g., server end stations) belonging to a service or content provider or end stations participating in a peer to peer service, and may include public web pages (free content, store fronts, search services, etc.), private web pages (e.g., username/password accessed web pages providing email services, etc.), corporate networks over VPNs, IPTV, etc. Typically, subscriber end stations are coupled (e.g., through customer premise equipment coupled to an access network (wired or wirelessly)) to edge network elements, which are coupled (e.g., through one or more core network elements to other edge network elements) to other end stations (e.g., server end stations).

The embodiments of the present invention provide a system, network and method for avoiding the disadvantages of the prior art including: duplication of information, processing each time a host sends a message containing group record related data, slow processing time inducing delay in the system and longer 'zapping' times (i.e., time required to change between sources) caused by having to perform redundant processing to extract source identification information from message, and a requirement to refresh state data for the routing tables in turn requires sending control messages from an L2 network element.

The embodiments of the invention overcome these disadvantages by using only a light HMP on the multicast router and relying on a message format utilized by the L2 network element that provides only the minimum information needed to maintain the routing tables and that does not require any processing by the light HMP to pass on to the multicast routing protocol except removal of the protocol header from the message. This provides the following advantages: more efficient processing due to avoiding processing and transmission or sharing of duplicate information including avoiding maintenance of state information by the light HMP at the multicast router, simplified processing for the light HMP by providing it only a simple smaller message with a source interest list and indicators for the type or routing update needed that can be passed to the multicast routing protocol, and improved zapping times due to overall network and system efficiency.

In addition, other embodiments of the present invention provide a system, network and method for avoiding the disadvantages of the prior art including: duplication of information processing each time a host sends a message containing previously received sources, creation of two lists (i.e., include lists and exclude lists) when sending source information, poor scaling due to the large size of source lists, vulnerability to denial of service attacks by repeated sending of large source lists, slow processing time inducing delay in the system and longer 'zapping' times (i.e., time required to change between sources).

These embodiments of the invention overcome these disadvantages by identifying differences between source interest lists received from hosts and a source state at network element. Only the differences between the source interest list and the source state are provided to the multicast routing protocol. This provides the following advantages: more efficient processing due to avoiding processing and transmission or sharing of duplicate information, simplified processing for the multicast routing protocol by providing it only a single smaller source interest list to process, scalability due to only processing the differences between source state and source interest list information, enhanced security enabled by ignoring redundant source interest lists, improved zapping times due to overall network and system efficiency.

Figure 1:
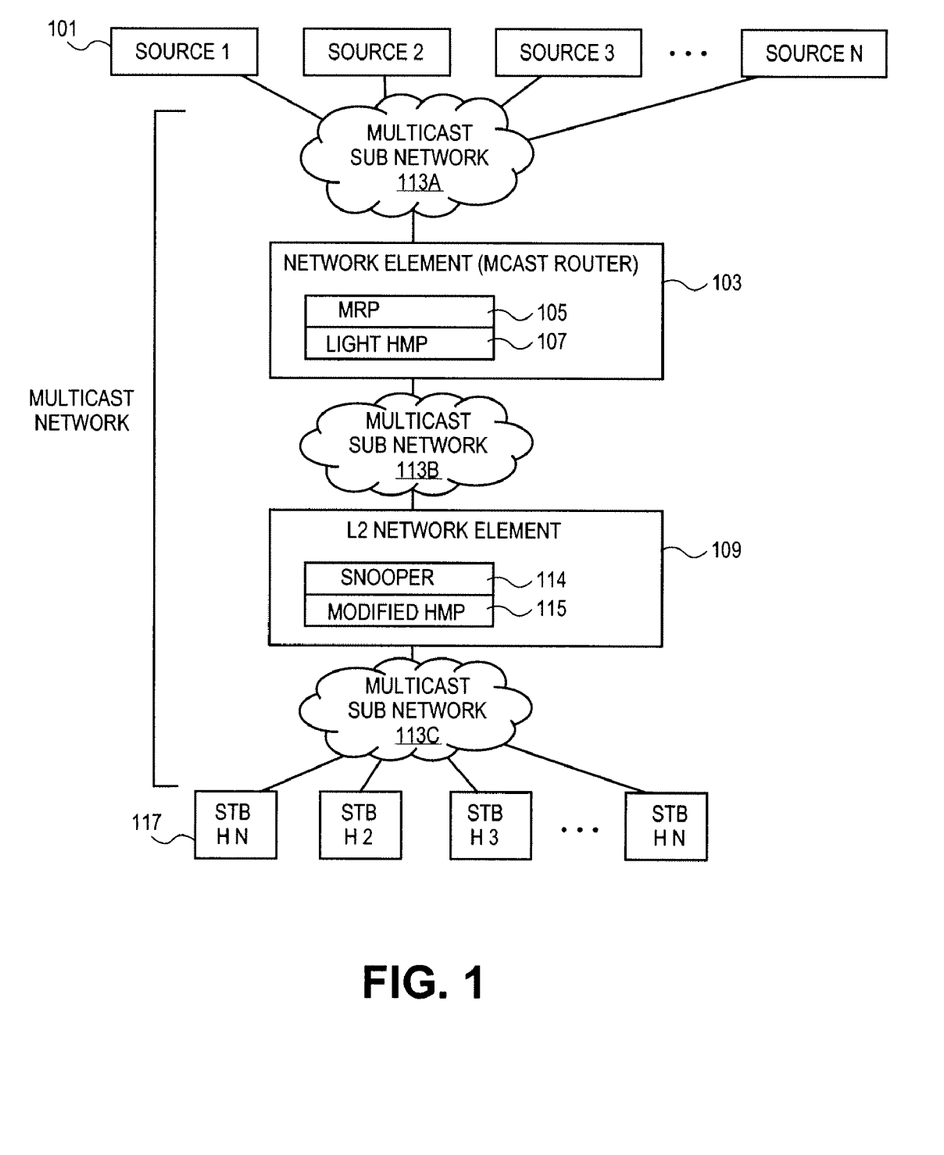
FIG. 1 is a diagram of one embodiment of a network for host management and multicast routing.

FIG. 1 is a diagram of one embodiment of a network for host management and multicast routing. The network includes a set or sources 101, a multicast network including multicast sub networks 113A-113C, a multicast router 103, L2 network element 109 and set top boxes (STBs) 117 and similar components. A 'set,' as used herein refers to any positive whole number of items including one item. The multicast sub networks 113A-113C connecting the components of the system can be separate networks, different aspects of the same network or combinations thereof. The multicast sub networks 113A-113C can be local area networks (LANs), wide area networks (WANs), such as the Internet, or similar networks. The networks 113A-113C can include any combination of wired or wireless network elements and end stations and lines of communication between the network elements and end stations.

The STBs 117 can be any type of host device for managing the delivery of source data to a user. An example of an STB is console device for delivering Internet Protocol Television (IPTV) to a user. STBs 117 can include console devices, gaming devices, desktops, workstations, digital video recorders (DVRs), optical disk playback devices (e.g., digital versatile disc (DVD) players), handheld devices, cellular phones and similar computing devices. These devices execute software or include hardware components that manage the user experience and generate requests for any number of data sources 101.

These STBs 117 or 'hosts' generate a list of sources that are of interest to a user or 'source interest lists' that are sent to network element 109 executing a modified host management protocol (HMP). In one embodiment, these source interest lists contain a full set of all sources that the STB 117 is requesting in the form of an include list or an exclude list. In another embodiment, the source interest lists received from a STB 117 may only reflect changes to its source interests. An include list is a set of sources that the STB 117 is requesting to be sent to the STB 117. An exclude list is a set of sources that the STB 117 is requesting not to be sent to the STB 117. Each time a list is sent by the STB 117 it may be a list of changes to the settings or sources or a complete list reflecting all user input or settings received to that point. The format of the message can be in the Internet Group Management Protocol (IGMP), Multicast Listener Discover (MLD) fog mats or any similar protocol used to convey host information to the multicast network elements. These messages can be sent over the multicast sub network 113C to an L2 network element 109 or a multicast router 103.

The invention encompasses alternative embodiments including an embodiment where the STBs 117 communicate directly with a modified HMP 107 on a multicast router 103 or similar network element. In another embodiment, the invention includes at least one L2 network element 109 where a modified HMP 115 processes the source interest lists received from the STBs 117.

Figure 2:
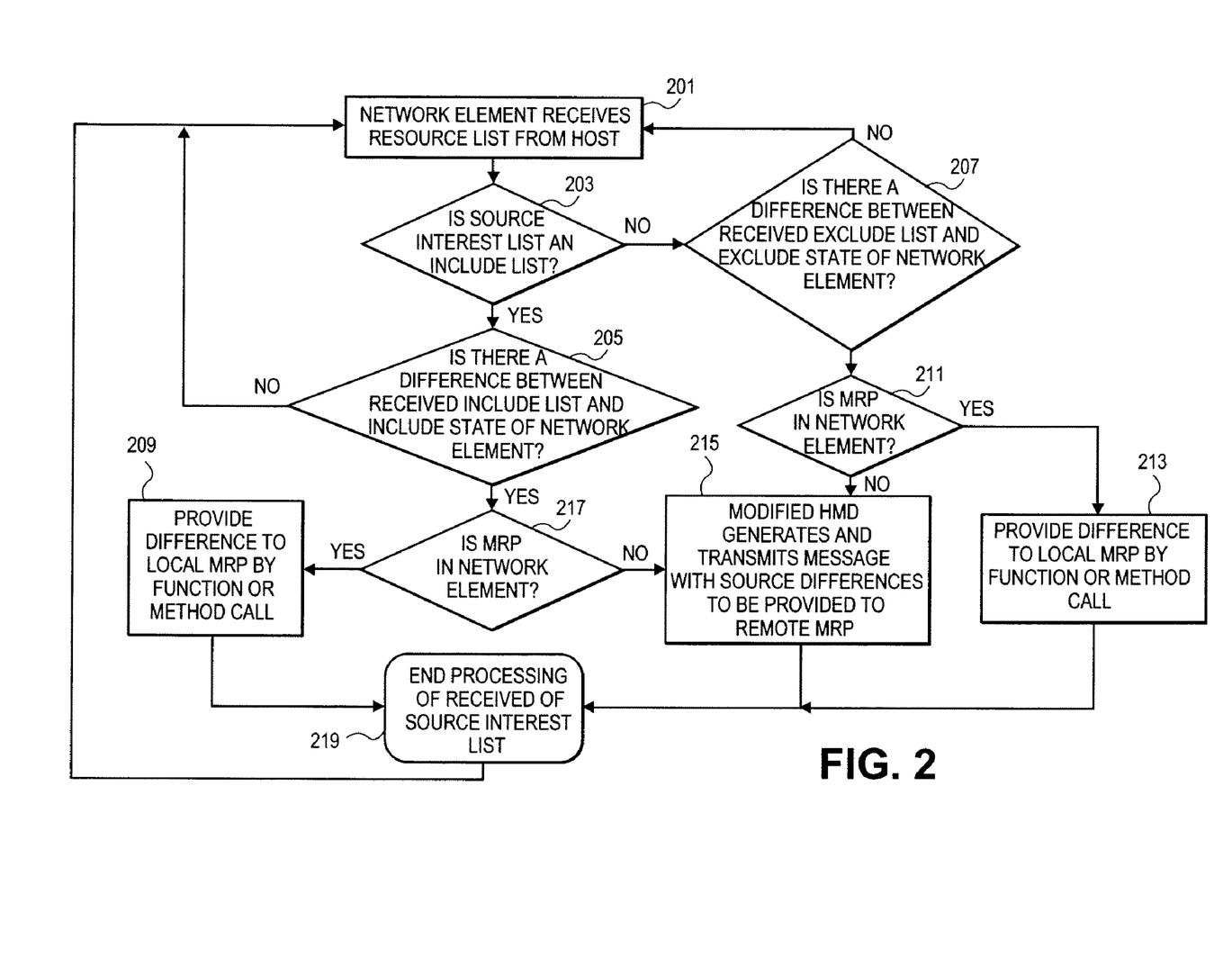
FIG. 2 is a flowchart of one embodiment of a process for source interest list processing.

In the embodiment of the multicast network where an L2 network element 109 is present, a modified HMP 115 on the L2 network element 109 process each received message from each of the hosts and maintains a source state based on the source interest list for each STB 117. The processing of the messages received from the STBs 117 is discussed in greater detail herein below in reference to FIG. 2 and FIG. 3. In one embodiment, the modified HMP 115 identifies the differences between the received source interest list and the maintained source state. In other embodiments, the process as described in greater detail in FIG. 2 is omitted. The modified HMP 115 then provides this information to a multicast routing protocol (MRP) by generating a message to be sent through a remote modified HMP 107 to the remote MRP 105 or calls a function or method (e.g., of an application programming interface (API)) of a local MRP or local L2 snooper 111.

In one embodiment, the message or call passes on only the difference in state or sources instead of the entire source interest list to minimize the computational resources and bandwidth required to update the multicast routing. The MRP updates the multicast routing from the various sources 101 in accordance with the received source interest list change. The MRP can be any multicast routing protocol including Protocol Independent Multicast (PIM), PIM—sparse mode and similar MRPs.

Figure 3:
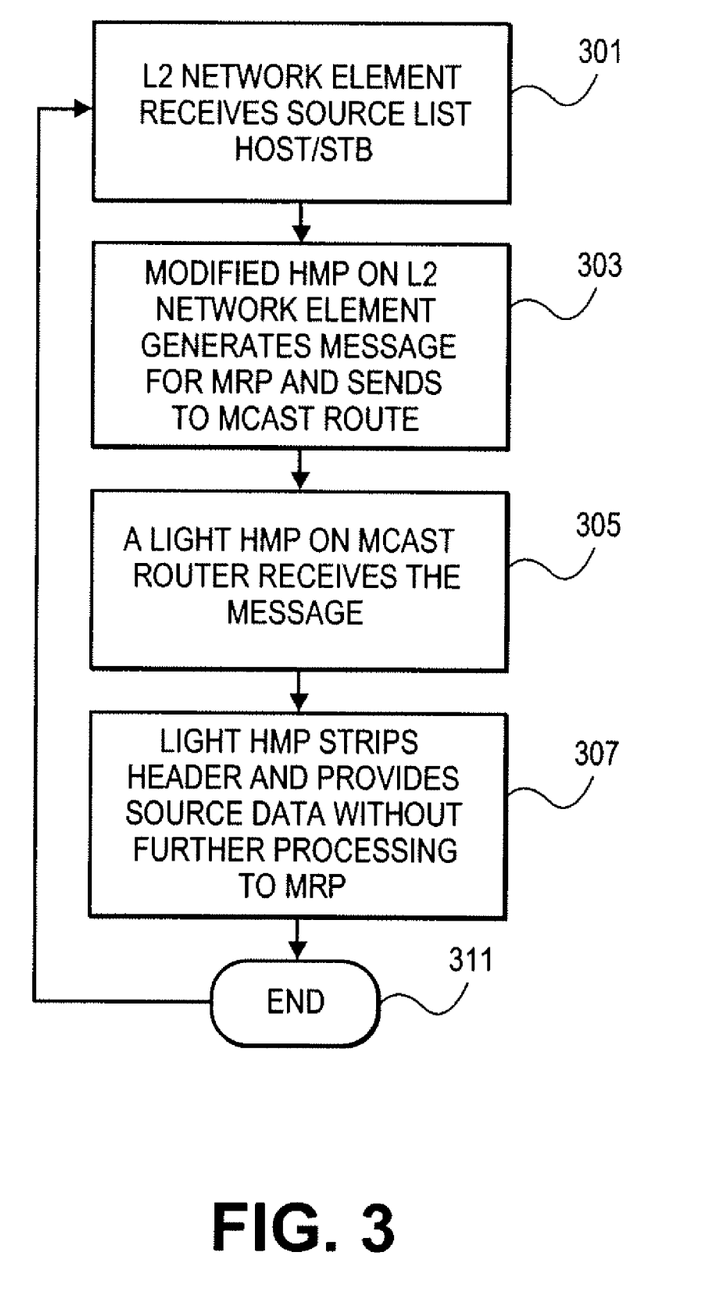
FIG. 3 is a flowchart of one embodiment of a process for source interest list processing.

The modified HMP 115 also generates a simplified message and the requisite data to formulate this message as described further in FIG. 3. This simplified message is capable of being processed by a light HMP 107 instead of a full HMP. The modified HMP 115 utilizes its state information and its analysis of the receives source list and related information in the message received from the host to determine generate a source identifier list of sources to be either directed to a host or blocked from a host. This information is used to set two fields in the message that indicate a default for non-specified sources (i.e., forward to host or block from host) and whether the specified source are to be forwarded to the host or blocked.

The modified HMP 115 and MRP or L2 snooper 111 present on the L2 network element 109, as well as, the modified HMP 107 and MRP 105 present on the multicast router 103 can be implemented as a software components in the form of instructions to be executed by line cards, control cards, network processors or similar processing components of the respective network elements 109, 103. In other embodiments, these elements are implemented as firmware or hardware components.

Source state information can be tracked at the modified HMP 115 as an aggregate of all STBs 117 connected to a network element on a subnet, as separate information for each STB or similarly tracked. Similarly, the source state information can be tracked as a set of source identifiers, source addresses or similar information sufficient for identifying a specific source in the multicast network. The source state can be implemented by separately tracking sources to exclude from each host, sources to include for each host or by complete tracking of either. The source state can also be tracked for both individual STBs 117 and multiple STBs in aggregate.

In multicast networks where an L2 network element 109 is present, but the MRP 105 is only present on a separate multicast router 103, the message is sent over the multicast sub network 113B to an HMP or light HMP 107 present on the multicast router 103. The format of the message is discussed in greater detail below. A standard message format according to IGMP or MLD is handled by an HMP local to the multicast router 103. The HMP 107 processes the received message and calls (e.g., through a function or method of an API) the MRP 105 to provide it with the source interest list or source interest list changes that were received. A light message is handled by a light HMP 107 where the light HMP only removes the header of the message before providing it to the MRP and calling the MRP with an appropriate function or method using the parameters specified by the message (i.e., default 'forward', 'prune' or 'delete' and source identifier list 'forward,' 'prune' or 'delete') thereby reducing the processing and space requirements for the multicast router 103. The light HMP 107 does not maintain a source state and relies on the parameters specified in the message. Upon receipt of the updated source interest list, the MRP updates its routing tables to provide the requested data from sources 101 to the hosts 117 over the multicast sub network 113A.

The L2 network element 109 can be any type of network router or network element capable of executing a modified HMP and/or snooper or providing modified HMP and snooper implementation in firmware or hardware or any combination thereof. The L2 network element 109 can support any number of STBs 117 or hosts using any type of networking protocol. The multicast network can include any number of L2 network elements 109 that operate in parallel to service the STBs 117.

The multicast router 103 is a network element that implements multicast routing and the MRP. The multicast router 103 can be any type of networking element capable of implementing MRP 105 and a light HMP 107 or full HMP. The multicast router 103 can support any number of STBs 117 or hosts, sources 101 or L2 network elements 109 using any type of networking protocol. The multicast system can include any number of multicast routers 103 that operate in parallel to service the STBs 117 and sources 101.

The sources 101 can be any type of data sources provided by any number of end station servers. The data sources 101 can be streaming or static data sources. The data provided can be IPTV data or similar sources suitable for multicasting. The servers providing these services can utilize any multicast protocol for transmitting these source data to the hosts over the multicast network including the multicast sub networks 113A-113C. The servers providing the sources 101 can be any type of computing devices including dedicated server machines, desktops, workstations or similar computing devices.

FIG. 2 is a flowchart of one embodiment of a process for source interest list processing. This process is primarily implemented at the network element executing the modified HMP and/or the device implementing the MRP. The process interacts with each of the components of the multicast network that have been separately initialized including the hosts (e.g., the STBs), modified HMP and MRP across the relevant network elements in the multicast network including L2 network elements, multicast routers and related machines. The process is continuously executed and triggered by the generation of a source interest list at a host and the reception of this source interest list at the network element executing the modified HMP (block 201). The source interest list can be periodically generated by the host or generated in response to a user interaction with the host such as the user specifying a new source to be requested.

The source interest list is sent to the modified HMP implemented either at an L2 network element or at a multicast router. The modified HMP analyzes the source interest list to determine if it is an include list (i.e., a source interest list that indicates each of the sources that the host is requesting to be sent to the host) (block 203). In other embodiments, source interest lists and source states may only be implemented as effective include lists or exclude lists. One skilled in the art would understand that these are subsets of the process described herein.

If the source interest list is not an include list, then it is known that the list is an exclude list (i.e., a source interest list that indicates each of the sources that the host does not want to receive). The modified HMP then compares the received source interest list with the exclude source state maintained by the modified HMP to determine whether there are any differences (block 207). If there are not differences between the received exclude list and the maintained exclude state then no action is required and the process awaits the next received source interest list (block 201).

However, if the comparison of the received exclude list and the exclude state maintained by the modified HMP reveals differences, then the modified HMP determines whether the MRP is present on the same device as the modified HMP carrying out the comparison (block 211). If the MRP is present on the same device, then the modified HMP sends the differences between the received exclude list and the current exclude state to the MRP via a function or method call or similar process (block 213). The function or method call can be made through an application programming interface (API) or similar interface. Providing the changes to the MRP completes the handling of the source interest list in the process (block 219) and the process awaits the reception of the next source interest list (block 201).

If the MRP is not present on the same device as the modified HMP, then the modified HMP prepares a message to be sent to the MRP at the multicast router or similar location (block 215). The message provides the differences between the received exclude list and the exclude state maintained by the modified HMP. In all cases, the modified HMP updates the maintained state to reflect the received exclude list. The HMP message can be a standard HMP or modified HMP message. After the message is sent, the processing of the received source interest list has completed (block 219) and the process awaits the reception of the next source interest list (block 201).

If the received source interest list is an include list (i.e., a source interest list that identifies those sources a host want to receive), then the modified HMP compares the received source interest list to the maintained include source state (block 205). If there is no difference between the received source interest list and the include source state maintained by the modified HMP, then no action is taken and the process awaits the next source interest list to be received (block 201).

If the comparison reveals differences between the received source interest list and the maintained include source state, then the modified HMP determines whether the MRP is present on the current network element (block 217). If the MRP is present on the current network element, then the modified HMP sends the difference between the received source interest list and the maintained include source state through a function or method call (e.g., a method or function of an API) to the MRP or similar mechanism (block 209). If the MRP is not present on the same network element as the modified HMP, then the modified HMP generates a message in a standard or modified HMP format. The HMP message is then sent to the multicast router (block 215). After the differences are provided to the MRP the processing of the received source interest list ends (block 219). The process then awaits the receipt of another source interest list (block 201). The include source state is updated to reflect the changes of the received source interest list during the comparison of the two.

FIG. 3 is a flowchart of one embodiment of a process for source interest list processing. This process describes the generation and processing of a light HMP message. The process assumes the initialization and continued operation of the hosts (e.g., STBs), L2 network elements, multicast router and related components. The process is then triggered by the L2 network element and the modified HMP implemented therein, in response to receiving a source interest list or host report from a host over a network (block 301). The modified HMP on the L2 network element then prepares a light HMP message to be provided to the MRP on a remote multicast router through the light HMP and sends the message once completed (block 303).

Generating the message includes processing the source interest list received from the host to update the source state maintained by the modified HMP. The light HMP message that is generated includes an entire representation of the changed state or only the changes to the state. The format of the light HMP message is shown in detail below in regard to FIG. 5. As part of completing the light HMP message the modified HMP determines a default for non-specified sources (i.e., whether sources not explicitly listed in a source state or source interest list are to be blocked or forwarded to a host) and whether the source state or source interest list is an include or exclude list, which correspond to forwarding the sources and pruning them, respectively. This information is stored in the message and allows the light HMP to utilize the information to direct the MRP to forward or prune sources without having to maintain the source state at the multicast router.

A light HMP on the multicast router receives the light HMP message (block 305). The light HMP then strips the message of its header and provides the data from the message to the MRP (block 307). The data is provided by a function call (e.g., a method or function of an API) or similar mechanism to the MRP. No other processing other than the removal of the header is performed by the light HMP. This is enabled by the format of the light HMP message, which contains data in a format that can be processed by the MRP once the protocol header is stripped. The header of the light HMP message indicates whether the data of the message, which is a list of source identifiers is to be forwarded, pruned or deleted and similarly whether non-specified sources are to be forwarded, pruned or deleted by default. This information may be passed to the MRP as a parameter of the function or method of the MRP that was called or in selecting the function or method. The light HMP does not maintain a source state thereby reducing its processing requirements.

Reducing the processing requirements for the message reduces the processing requirements of the multicast router as a whole and enables those resources to be utilized for other functions thereby improving the efficiency of the multicast router and the overall multicast network. Similarly, the light HMP message is simpler and contains less data than a standard HMP message, thereby reducing the bandwidth requirements of the network.

Figure 4A:
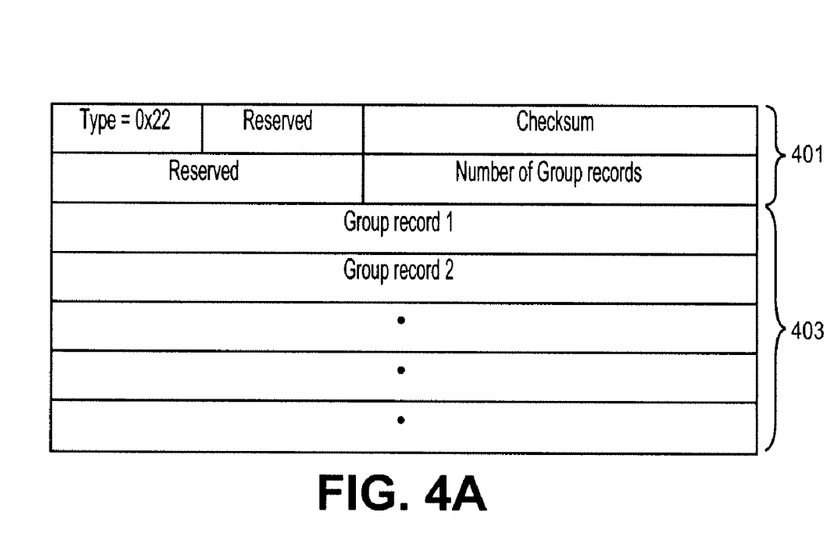
FIG. 4A is a diagram illustrating one embodiment of a standard HMP message.

FIG. 4A is a diagram illustrating one embodiment of a standard HMP message. The standard HMP message includes a header 401 with a Type field, two Reserved fields, a Checksum field, and a number of group records field. The body of the message includes a set of group records.

Figure 4B:
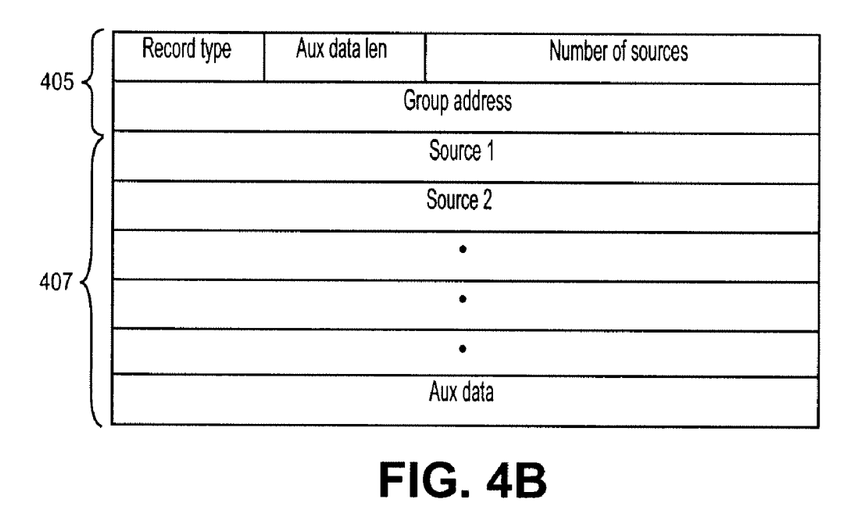
FIG. 4B is a diagram illustrating one embodiment of a group record in a standard HMP message.

FIG. 4B is a diagram illustrating one embodiment of a group record in a standard HMP message. The individual group records include a header section 405 and body section 407. The header section includes a Record Type field, Auxiliary Date Length field, Number of Sources field and Group Address field. The body contains a set of source identifiers such as IP addresses for the end stations or servers that provide the source data. This complicated layered structure requires a full HMP to parse the message to identify the source identifiers in the message and to maintain a source state based on these source identifiers.

Figure 5:
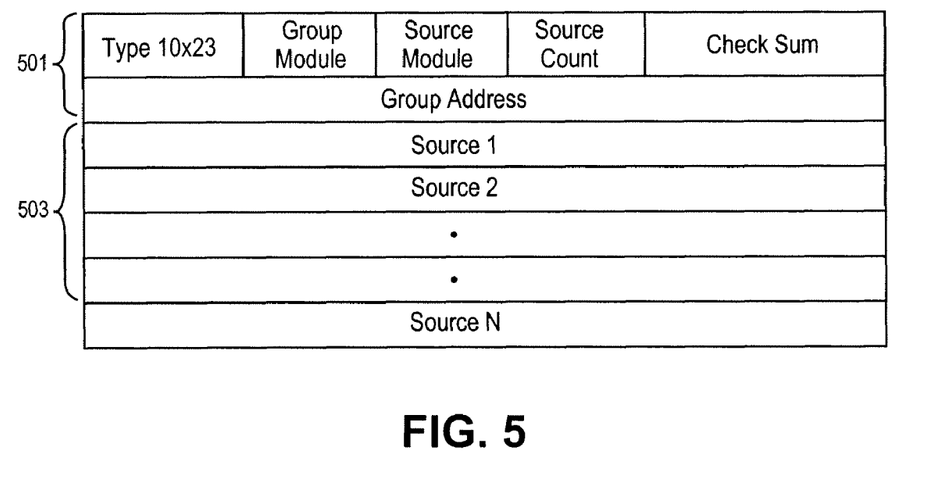
FIG. 5 is a diagram illustrating one embodiment of an efficient light HMP message.

FIG. 5 is a diagram illustrating one embodiment of an efficient light HMP message. The light HMP message has a simpler format than the standard HMP message and once stripped of its header 501 the body 503 is a list of the sources that can be utilized by the MRP without further processing. The header 501 includes a Type field, a Group Mode field, a Source Mode field, a Source Count field and a Checksum field.

In one embodiment, the Type field identifies the message as a source update report or message allowing the light HMP to recognize it as something that can be processed by stripping the header and providing the body of the message to an MRP. The type field may be a 2 bit field. The Group mode field can also be a 2 bit field that can be set to indicate 'forward,' 'prune' or 'delete.' The Group mode field indicates the default for all sources from which traffic is received at a network element, but not specifically tracked in a source interest list received from a host. If a host wants to receive traffic only from certain sources then the mode will be set to prune and traffic from all other sources will be dropped. If a host does not want to receive traffic from only certain sources, then the mode is set to forward and traffic from all other sources will be forwarded to the host. When the HMP wants the state for sources to be deleted in the MRP, the mode can be set to delete.

The Source mode can also be a 2 bit field that is similar to the Group mode field. The same settings of prune, forward and delete can be specified, but the settings only apply to the source identifier list in the message. Thus, if a host wants to receive traffic only from the list of source identifiers, then the source mode is set to forward. If the host does not want to receive traffic from the list of source identifiers then the source mode is set to prune.

The source count field can have a size of 10 bits and indicates the number or source identifiers in the body of the message. The checksum field can be a 16 bit field that may be a 16-bit one's complement of the one's complement sum of the whole message. For computing the checksum, the checksum field itself can be set to zero. The light HMP verifies a checksum before processing the message. The group address field is set to the multicast address for which the host has sent the request. The source identifier fields are 32 bit or 64 bit IP addresses of the sources.

Thus, a method, system and apparatus for host protocol management have been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method for reducing computational or bandwidth requirements in a network including a multicast router and a layer 2 network element by efficiently communicating required source state information, the method comprising the steps of:

receiving at the layer 2 network element, executing a modified host management protocol, a source interest list from a host over a multicast network, wherein the source interest list identifies at least one multicast source to be one of excluded or included from routing to the host;

responsive to the step of receiving, transmitting by the layer 2 multicast network element a message to the multicast router, wherein the message is formatted to be processed by a multicast routing protocol on the multicast router after a light host management protocol (LHMP) header is removed by the LHMP on the multicast router without any additional processing of the message by the LHMP at the multicast router; and responsive to receiving the message at the multicast router, the light host management protocol removing the LHMP header and sending the message to the multicast routing protocol to alter a set of multicast sources to be routed to the host, where the LHMP header is identified by a field in the LHMP header that indicates a body of the message can be directly processed by the multicast routing protocol.

2. The method of claim 1, wherein the message format includes a group mode field, source mode field, group address field and a plurality of source identifier fields.

3. The method of claim 1, wherein the multicast routing protocol is protocol independent multicast—sparse mode, and wherein the source interest list is formatted according to one of an internet group management protocol and a multicast listener discovery protocol.

4. The method of claim 2, wherein the message format does not include any group record data.

5. The method of claim 2, wherein the group mode field specifies a default category of forward, prune or delete for all sources not present in the plurality of source identifier fields, and wherein the source mode field specifies a category of forward, prune or delete for each of the plurality of source identifier fields.

6. A network with reduced computational or bandwidth requirements, the network to efficiently communicate required source state information, the network comprising:

a host device adapted to track a first source interest list based on user input and adapted to transmit the source interest list the network to a first network element, wherein the source interest list identifies at least one multicast source to be one of excluded or included from routing to the host;

a first network element in communication with the host device over the network, wherein the first network element is adapted to execute a modified host management protocol, wherein the modified host management protocol generates a message based on the source interest list, wherein the message is formatted to be processed by a multicast routing protocol at a second network element after a light host management protocol (LHMP) header is removed without any additional processing by the light host management protocol at the multicast router, where the LHMP header is identified by a field in the LHMP header that indicates a body of the message can be directly processed by the multicast routing protocol, wherein the modified host management protocol transmits the message to the second network element executing the multicast routing protocol to alter a set of multicast sources to be routed to the host device; and the second network element adapted to manage multicast routing based on the message received over the network from the first network element, wherein the second network element executes the light host management protocol and the multicast routing protocol, wherein the light host management protocol removes light host management the protocol header from the message and forwards the message to the multicast routing protocol without further processing of the message.

7. The network of claim 6, wherein the message format includes a group mode field, source mode field, group address field and a plurality of source identifier fields.

8. The network of claim 6, wherein the multicast routing protocol is protocol independent multicast—sparse mode, and wherein the source interest list is formatted according to one of an internet group management protocol and a multicast listener discovery protocol.

9. The network of claim 7, wherein the message format does not include any group record data.

10. The network of claim 7, wherein the group mode field specifies a default category of forward, prune or delete for all sources not present in the plurality of source identifier fields, and wherein the source mode field specifies a category of forward, prune or delete for each of the plurality of source identifier fields.

11. A network element executing a modified host management protocol to reduce computational or bandwidth requirements for multicast routing by efficiently communicating required source state information, the network element comprising:

a modified host management protocol component adapted to receive a source interest list from a host over a network, wherein the modified host management protocol component is adapted to generate a message based on the source interest list, wherein the message is formatted to be processed by a multicast routing protocol after a light host management protocol (LHMP) header is removed without any additional processing by the light host management protocol, where the LHMP header is identified by a field in the LHMP header that indicates a body of the message can be directly processed by the multicast routing protocol, wherein the modified host management protocol component is adapted to transmit the message to a second network element executing the light host management protocol and a multicast routing protocol to alter a set of multicast sources to be routed to the host.

12. The network element of claim 11, wherein the message format includes a group mode field, source mode field, group address field and a plurality of source identifier fields.

13. The network element of claim 11, wherein the multicast routing protocol is protocol independent multicast—sparse mode, and wherein the source interest list is formatted according to one of an internet group management protocol and a multicast listener discovery protocol.

14. The network of claim 12, wherein the message format does not include any group record data.

15. The network of claim 12, wherein the group mode field specifies a default category of forward, prune or delete for all sources not present in the plurality of source identifier fields, and wherein the source mode field specifies a category of forward, prune or delete for each of the plurality of source identifier fields.

16. A method for reducing computational or bandwidth requirements of multicast routing in a network including a multicast router, layer 2 network element and a host, the method comprising the steps of:
  receiving at the multicast router a message formatted to be processed by a multicast routing protocol on the multicast router after a light host management protocol header is removed by the light host management protocol on the multicast router without any additional processing by the light host management, wherein the message has been generated and transmitted by a modified host management protocol on the layer 2 network element responsive to a source interest list received from the host, wherein the source interest list identifies at least one multicast source to be one of excluded in or included from routing to the host;
  removing the light host management protocol (LHMP) header by the light host management protocol in the multicast router, where the LHMP header is identified by a field in the LHMP header that indicates a body of the message can be directly processed by the multicast routing protocol;
  providing the message with the light host management protocol header removed to the multicast routing protocol; and
  altering a set of multicast sources to be routed to the host based on the message by the multicast routing protocol.

17. The method of claim 16, wherein the message format includes a group mode field, source mode field, group address field and a plurality of source identifier fields.

18. The method of claim 16, wherein the multicast routing protocol is protocol independent multicast—sparse mode, and wherein the source interest list is formatted according to one of an internet group management protocol and a multicast listener discovery protocol.

19. The method of claim 17, wherein the message format does not include any group record data.

20. The method of claim 17, wherein the group mode field specifies a default category of forward, prune or delete for all sources not present in the plurality of source identifier fields, and wherein the source mode field specifies a category of forward, prune or delete for each of the plurality of source identifier fields.

* * * * *

UNITED STATES PATENT AND TRADEMARK OFFICE
CERTIFICATE OF CORRECTION

PATENT NO. : 8,379,641 B2
APPLICATION NO. : 12/558365
DATED : February 19, 2013
INVENTOR(S) : Nanda et al.

Page 1 of 1

It is certified that error appears in the above-identified patent and that said Letters Patent is hereby corrected as shown below:

On the Title Page, in Item (57), under "ABSTRACT", in Column 2, Line 1,
delete "a method" and insect -- A method --, therefor.

In the Specifications:

In Column 4, Line 8, delete "and a" and insert -- and/or a --, therefor.

In Column 4, Line 19, delete "and" and insert -- and/or --, therefor.

In Column 4, Line 28, delete "and subscriber" and insert -- and/or subscriber --, therefor.

In Column 5, Line 53, delete "S'I'B" and insert -- STB --, therefor.

In Column 6, Line 11, delete "fog mats" and insert -- formats --, therefor.

In Column 7, Line 41, delete "HMP and" and insert -- HMP and/or --, therefor.

Signed and Sealed this
Fourth Day of June, 2013

Teresa Stanek Rea
*Acting Director of the United States Patent and Trademark Office*